United States Patent [19]

Ernst

[11] Patent Number: 5,066,857
[45] Date of Patent: Nov. 19, 1991

[54] INCREMENTAL ANGLE ENCODER HAVING SPIRAL SCANNING FIELD AND MULTIPLE DISCS

[75] Inventor: Alfons Ernst, Traunreut, Fed. Rep. of Germany

[73] Assignee: Johannes Heidenheim GmbH, Traunreut, Fed. Rep. of Germany

[21] Appl. No.: 566,550

[22] Filed: Aug. 13, 1990

[30] Foreign Application Priority Data

Aug. 14, 1989 [DE] Fed. Rep. of Germany ....... 3926799

[51] Int. Cl.$^5$ ............................................. G01D 5/34
[52] U.S. Cl. ........................... 250/231.15; 250/231.17
[58] Field of Search ................ 250/231.14, 231.15, 250/231.17, 231.18

[56] References Cited

U.S. PATENT DOCUMENTS

| | | | |
|---|---|---|---|
| 3,525,094 | 8/1970 | Leonard | 250/231.15 |
| 3,693,024 | 9/1972 | Hulle et al. | 250/231.15 |
| 4,841,297 | 6/1989 | Bourgeaux et al. | 250/231.15 |

FOREIGN PATENT DOCUMENTS

| | | |
|---|---|---|
| 300183 | 1/1989 | European Pat. Off. |
| 3416090 | 9/1985 | Fed. Rep. of Germany |

*Primary Examiner*—David C. Nelms
*Assistant Examiner*—K. Shami
*Attorney, Agent, or Firm*—Willian Brinks Olds Hofer Gilson & Lione

[57] ABSTRACT

An incremental angle encoder of the invention has an encoder shaft connected with a first disk having an incremental angular graduation and a first and a second reference mark. A second disk is connected to this first disk via a reduction gear, on which a spiral-shaped reference scanning field is provided. A first scanning unit scans the incremental angular graduation to generate two scanning signals and the first reference mark to generate a first reference signal. A second scanning unit scans the second reference mark utilizing the spiral-shaped reference scanning field to generate a second reference signal. A specific offset, which indicates the number of revolutions of the encoder shaft, exists between the first reference signal and the second reference signal because of the spiral-shaped reference scanning field. An absolute angular measurement value for the encoder shaft is determined from the scanning signals and from the specific offset for the number of revolutions.

21 Claims, 7 Drawing Sheets

Fig. 4

INCREMENTAL ANGLE ENCODER HAVING SPIRAL SCANNING FIELD AND MULTIPLE DISCS

BACKGROUND OF THE INVENTION

1. Field of the Invention

The invention relates to an incremental angle encoder having a first disk with a graduation and a first and a second reference mark connected to a second disk having a spiral shaped reference scanning field thereon. A first reference signal is generated by scanning the first reference mark and a second reference signal is generated by scanning the second reference mark through the reference scanning field on the second disk. The number of revolutions of the encoder shaft is determined by the offset between the two reference signals.

2. Description of Prior Art

From EP-A1-0 300 183 an incremental angle encoder is known, having a disk with an incremental angular graduation and a reference mark, to which a two-stage absolute value encoder is coupled by means of a reduction gear, which records every revolution of the incremental angle encoder by means of a reference signal derived from the reference mark. A logic unit generates an additional reference signal from the reference signal of the incremental angle encoder, which, in accordance with the rpm value from the signals of the absolute value encoder, is offset from the reference signal of the incremental angle encoder. A processor determines the absolute angular measurement value from the increment signal of the incremental angle encoder, the signals of the absolute value encoder and the two reference signals.

This type of incremental angle encoder has the disadvantage that the system is large and expensive. For example, a two-stage, 10-bit absolute value encoder requires eleven photoelements and signal generators.

Another incremental angle encoder is described in German Published, Non-examined Patent Application DE-OS 34 16 090. A first disk having an incremental angular graduation and a reference mark is connected to a second disk with a second reference mark via a reduction gear. The reduction is chosen in such a manner that for every revolution of the encoder shaft with the first disk there is a specific offset between the two reference signals derived from the two reference marks. The absolute angular measurement value is determined from the incremental signal of the first disk and the specific offset between the two reference signals. This incremental angle encoder, however, has the disadvantage that the accurately of the offset between the two reference signals depends upon the accuracy of the reduction gear. This arrangement requires either great expenditure in the reduction gear or a toleration of a smaller number of distinguishable revolutions of the first disk.

SUMMARY OF THE INVENTION

It is an object of the present invention to recite an incremental angle encoder of a known species, which has a simple construction and permits the unambiguous distinction of a large number of revolutions of the encoder shaft bearing the disk with the incremental angular graduation.

In accordance with the present invention, an incremental angle encoder which generates signals from which the number of revolutions can be determined thereby indicating an absolute measurement utilizes a first disk connected to an encoder shaft with an incremental angular graduation and a first and a second reference mark. A second disk connected to a second shaft has a spiral shaped reference scanning field. A reduction gear connects the encoder shaft and the second shaft. Scanning means are provided which scan the first reference mark on the first disk thereby generating a first reference signal. The second reference mark is scanned through the reference scanning field on the second disk generating a second reference signal. The offset between the first and second reference signals is determined by the number of revolutions of the encoder shaft.

The advantages gained by means of the invention consist in particular in that a cost-efficient angle encoder is attained by means of the simple construction which allows great measuring distances with great measuring accuracy. For example, when measuring the longitudinal displacement of a carriage of a machining tool on the basis of a clear distinction between a large number of revolutions of the encoder shaft with the disk bearing the incremental angular graduation, this angle encoder can be employed universally with high technical production quality.

BRIEF DESCRIPTION OF THE DRAWINGS

Further objects and advantages of this invention will become more apparent and readily appreciated from the following detailed description of the present invention, taken in conjunction with the accompanying drawings, of which.

DETAILED DESCRIPTION OF THE PRESENTLY PREFERRED EMBODIMENTS

The preferred embodiments of the present invention will hereinafter be described in detail with reference to the accompanying drawings.

Figure 1:
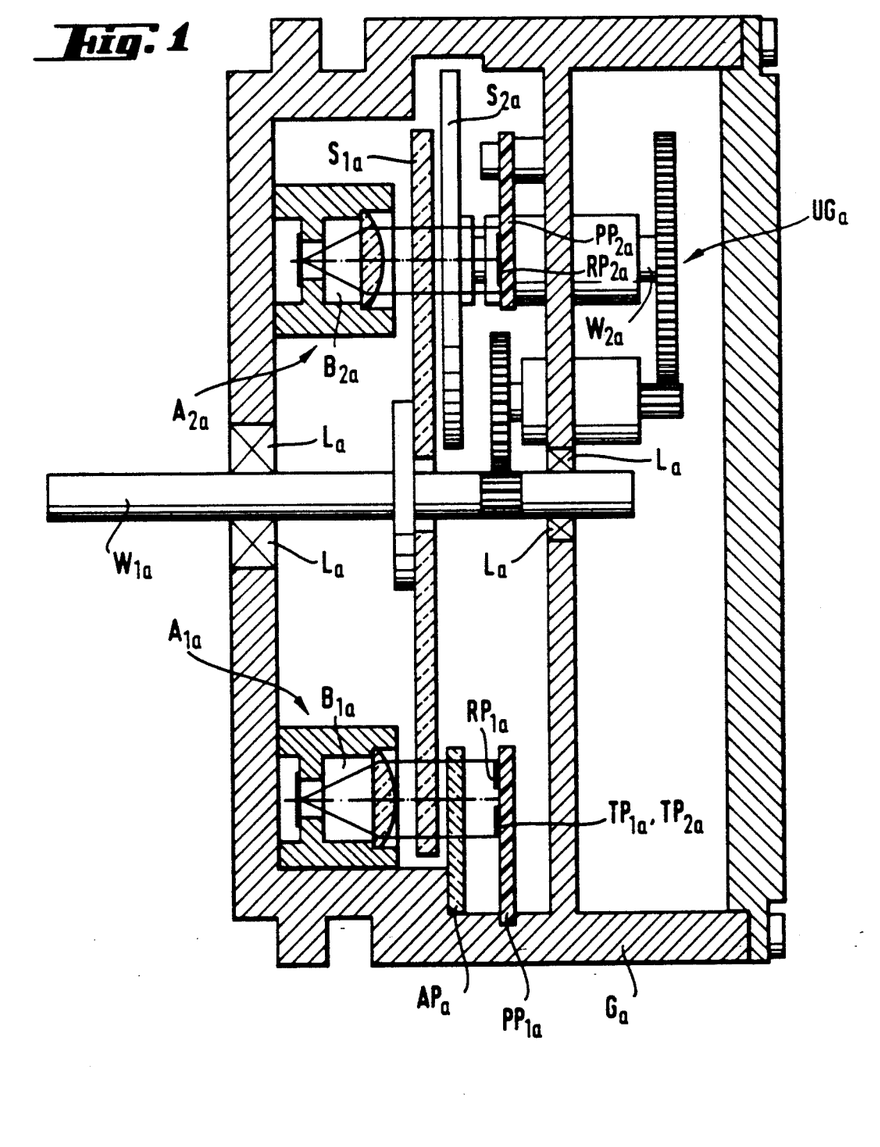
FIG. 1 is a cross-sectional view of an incremental angle encoder in accordance with a first embodiment of the present invention.

FIG. 1 is a cross-sectional view of an incremental angle encoder in accordance with a first embodiment of the present invention. Two disks $S_{1a}$ and $S_{2a}$ are located in the housing $G_a$ which may take the form of a stator fixed to a first object, for example, a machine frame of a machining tool (not shown). In the interior of the housing $G_a$ is a first shaft $W_{1a}$ in the form of a decoder shaft, rotably seated by means of bearing $L_a$ and connected with a second object, for example, the spindle of a carriage of a machining tool (not shown). The first shaft $W_{1a}$ supports the first disk $S_{1a}$. The two disks $S_{1a}$ and $S_{2a}$ are shown schematically in FIG. 2. The first disk $S_{1a}$ has on its periphery an incremental angular graduation $T_a$ with a graduation period C. A first reference mark $R_{1a}$ and a second reference mark $R_{2a}$ are fixedly assigned to the incremental angular graduation $T_a$ on the first disk $S_{1a}$. The incremental angular graduation $T_a$ is shown as a line graduation and the reference marks $R_{1a}$ and $R_{2a}$ are shown as single lines but the reference marks $R_{1a}$ and $R_{2a}$ can also each comprise a group of lines as is well known in the art.

Figure 3:
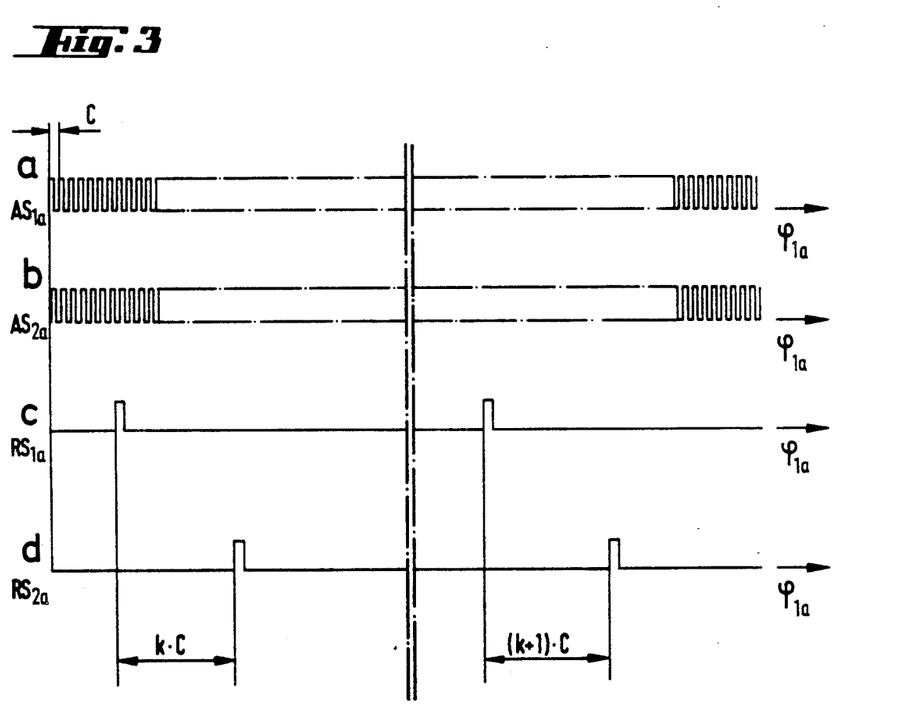
FIG. 3 is a signal diagram taken from the first embodiment of FIG. 1.

The incremental angular graduation $T_a$ of the first disk $S_{1a}$ is scanned by a first scanning unit $A_{1a}$. The first scanning unit $A_{1a}$ has a first illuminating unit $B_{1a}$ with parallel beam path, a scanning plate $AP_a$, two graduation scanning fields $TF_{1a}$ and $TF_{2a}$ and two associated graduation photo elements $TP_{1a}$ and $TP_{2a}$ on a first photo element plate $PP_{1a}$. The two scanning fields $TF_{1a}$ and $TF_{2a}$ are offset with respect to each other to generate two scanning signals $AS_{1a}$ and $AS_{2a}$, which are out of phase by 90° with respect to each other. Each signal has a period C corresponding to the graduation period C of the incremental angular graduation $T_a$. Signals $AS_{1a}$ and $AS_{2a}$ are illustrated in FIGS. 3a and b as a function of the angle of rotation $\rho_{1a}$ of the encoder shaft $W_{1a}$. The angular measurement values and the direction of rotation of the encoder shaft $W_{1a}$ are determined from signals $AS_{1a}$ and $AS_{2a}$ in a known manner.

Scanning unit $A_{1a}$ also scans the first reference mark $R_{1a}$. A first reference scanning field $RF_{1a}$ on the scanning plate $AP_a$ as well as an associated first reference photo element $RP_{1a}$ on the first photo element plate $PP_{1a}$, generates a first reference signal $RS_{1a}$. Signal $RS_{1a}$ is shown in FIG. 3c as a function of the angle of rotation $\rho_{1a}$ of the encoder shaft $W_{1a}$. Every time the first disk $S_{1a}$ completes one revolution, an $RS_{1a}$ pulse is generated.

The second disk $S_{2a}$ is supported on a second shaft $W_{2a}$, which is rotatably seated in the interior of the housing $G_a$ and is driven by the first shaft $W_{1a}$ via a reduction gear $UG_a$. In this embodiment, the reduction gear $UG_a$ has a reduction ratio $i_a=32$. Thus, after each full revolution of the first disk $S_{1a}$, the second risk $S_{2a}$ has turned 1/32nd of a revolution. The first disk $S_{1a}$ and the second disk $S_{2a}$ are disposed closely adjacent to each other in the direction of the light beam paths and are eccentrically offset parallel to each other.

The second reference mark $R_{2a}$ on the first disk $S_{1a}$ is also scanned by a second scanning unit $A_{2a}$, which has a second illuminating unit $B_{2a}$ with parallel beam path and a spiral-shaped second reference scanning field $RF_{2a}$ on the second disk $S_{2a}$. An associated second reference photo element $RP_{2a}$ on a second photo element plate $PP_{2a}$ generates a second reference signal $RS_{2a}$ per revolution of the first disk $S_{1a}$, shown in FIG. 3d as a function of the angle of rotation $\rho_{1a}$ of the encoder shaft $W_{1a}$. There is an angular offset between the first reference mark $R_{1a}$ and the second reference mark $R_{2a}$ on the first disk $S_{1a}$. This offset is chosen so that at the moment of first measurement or rather at the initial point from which the encoder begins its measurement, the first reference mark $R_{1a}$ is scanned by the first reference scanning field $RF_{1a}$ while the second reference mark $R_{2a}$ is simultaneously scanned by the first of the thirty-two continuously sequential scanning fields of the second reference scanning field $RF_{2a}$. Thus, at the start of measurement, there is no offset between the two pulses of the signals $RS_{1a}$ and $RS_{2a}$.

With each full revolution of the second disk $S_{2a}$, thirty-two continuously sequential scanning fields of the spiral-shaped second reference scanning field $RF_{2a}$ have been activated. These thirty-two scanning fields of the spiral-shaped second reference scanning field $RF_{2a}$ are radially offset from each other in accordance with a graduation period C of the incremental angular graduation $T_a$ on the second disk $S_{2a}$. Because the center $M_a$ of the second disk $S_{2a}$ is located on a tangent $TG_a$ at the center line $ML_a$ of the scanned second reference mark $R_{2a}$ of the first disk $S_{1a}$, the positions of the generated second reference signals $RS_{2a}$ in relation to the incremental angular graduation $T_a$ are not affected, even if there is relatively large play between the first disk $S_{1a}$ and the second disk $S_{2a}$ in the reduction gear $UG_a$.

The total measuring range of this first incremental angle encoder is 32 revolutions, (n=32), of the encoder shaft $W_{1a}$. The first reference signal $RS_{1a}$ only indicates that the first disk $S_{1a}$ has made a complete revolution. It does not indicate the number of revolutions, (k=1, 2, ... n) from the beginning of measurement. At the k-th revolution of the first disk $S_{1a}$, the second reference signal $RS_{2a}$ has a specific offset k×C with respect to the first reference signal $RS_{1a}$. As shown on the left side of FIG. 3, this offset characterizes the k-th revolution of the encoder shaft $W_{1a}$. At the (k+1)-th revolution of the first disk $S_{1a}$, the specific offset (k+1)×C characterizes the (k+1)-th revolution of the encoder shaft $W_{1a}$ as shown on the right side of FIG. 3. This specific offset k×C between the first reference signal $RS_{1a}$ and the k-th second reference signal $RS_{2a}$ is caused by the radial offset of one graduation period C between adjacent scanning areas of the spiral-shaped second reference field $RF_{2a}$. Depending on the direction of rotation of the first disk $S_{1a}$, the number k either increases or decreases by the value one (1) per revolution of the encoder shaft $W_{1a}$.

Figure 2:
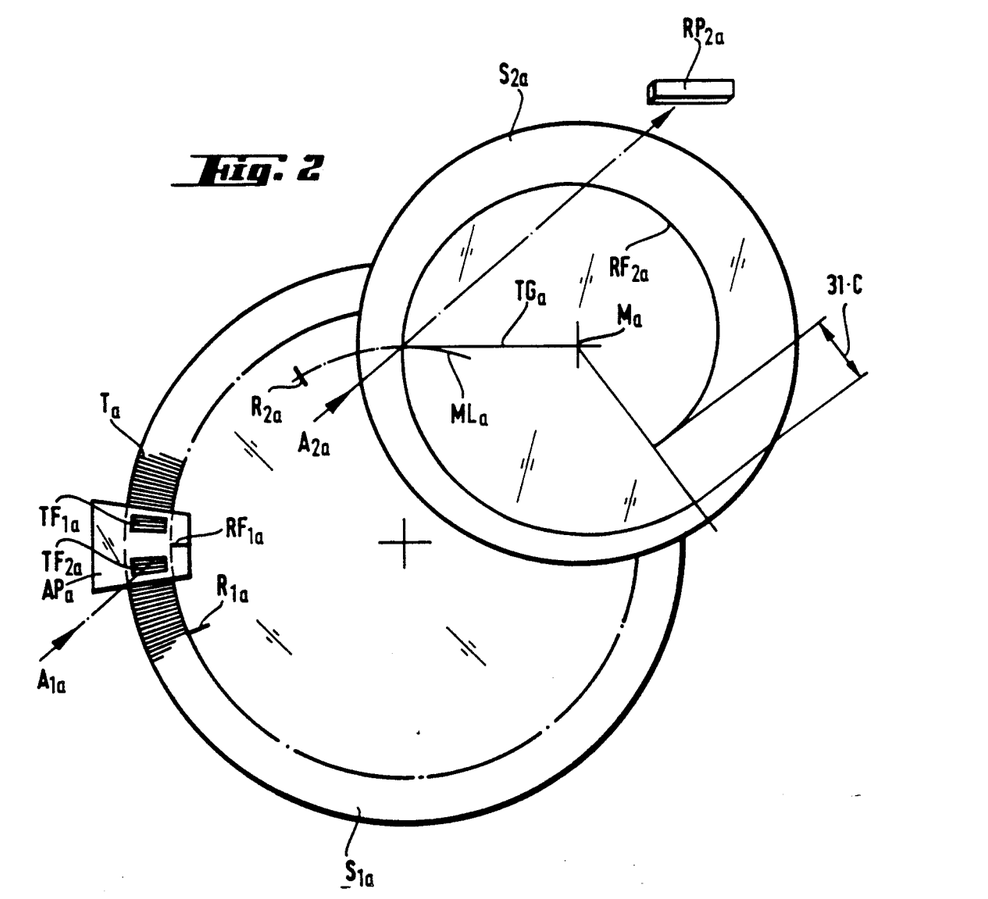
FIG. 2 is a schematic view of two disks used in the first embodiment of FIG. 1.

If the reference marks $R_{1a}$ and $R_{2a}$ and the reference scanning fields $RF_{1a}$ and $RF_{2a}$ are not each formed by a single line in accordance with FIG. 2, but rather consist of a group of lines with arbitrary division, it is possible to generate narrower and steeper reference signals $RS_{1a}$ and $RS_{2a}$. This creates the advantage of being able to use smaller reference photo elements $RP_{1a}$ and $RP_{2a}$. It is also possible to use smaller reference photo elements $RP_{1a}$ and $RP_{2a}$ if the parallel bundled light beams of the scanning units $A_{1a}$ and $A_{2a}$ are each focused by a lens. This had the added advantage of reducing the physical size of the encoder.

An absolute angular measurement value is determined from the scanning signals $AS_{1a}$ and $AS_{2a}$ and from the specific offset between the first reference signal $RS_{1a}$ and the second reference signal $RS_{2a}$ for the respective revolution.

In a manner not shown, the first reference mark $R_{1a}$ and the second reference mark $R_{2a}$ may also be combined into one reference mark. This creates an additional offset between the first reference signal $RS_{1a}$ and the second reference signal $R_{2a}$ which is arithmetically eliminated.

Figure 4:
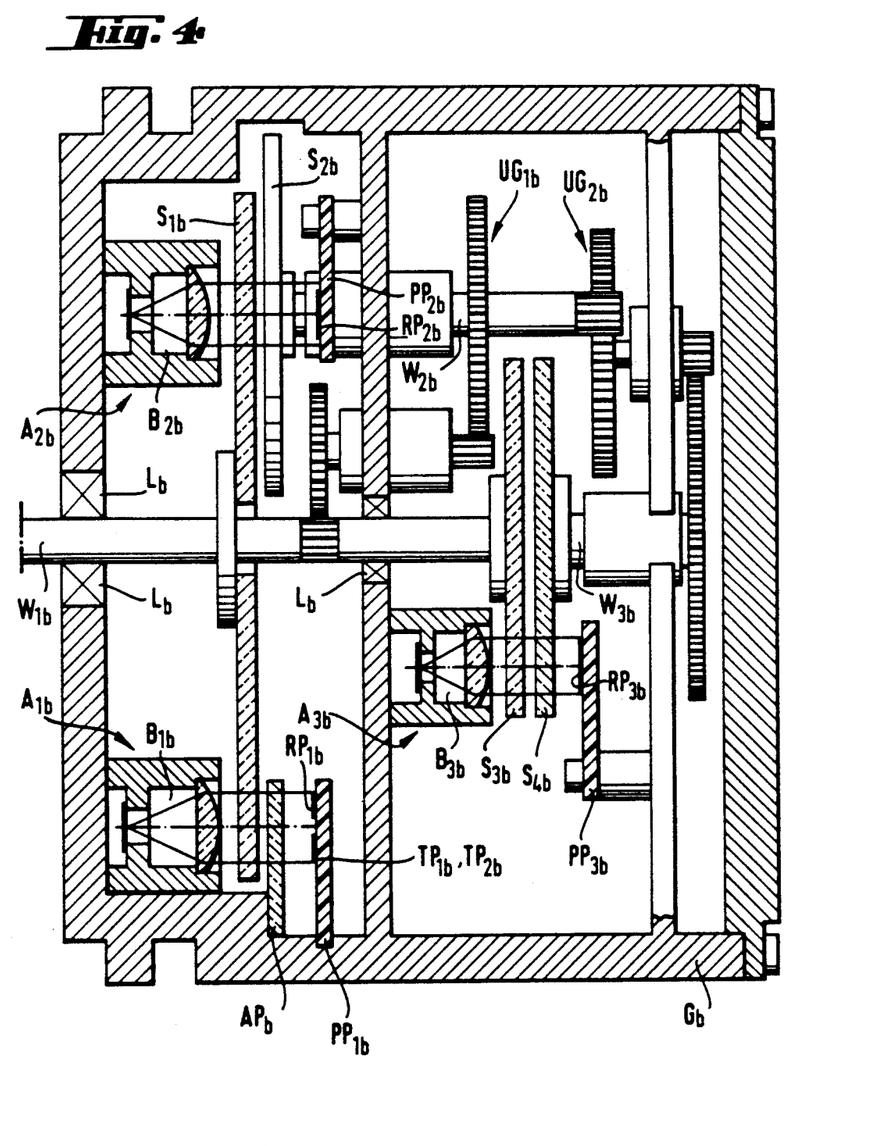
FIG. 4 is a cross-sectional view of an incremental angle encoder in accordance with a second embodiment of the present invention.
Figure 5:
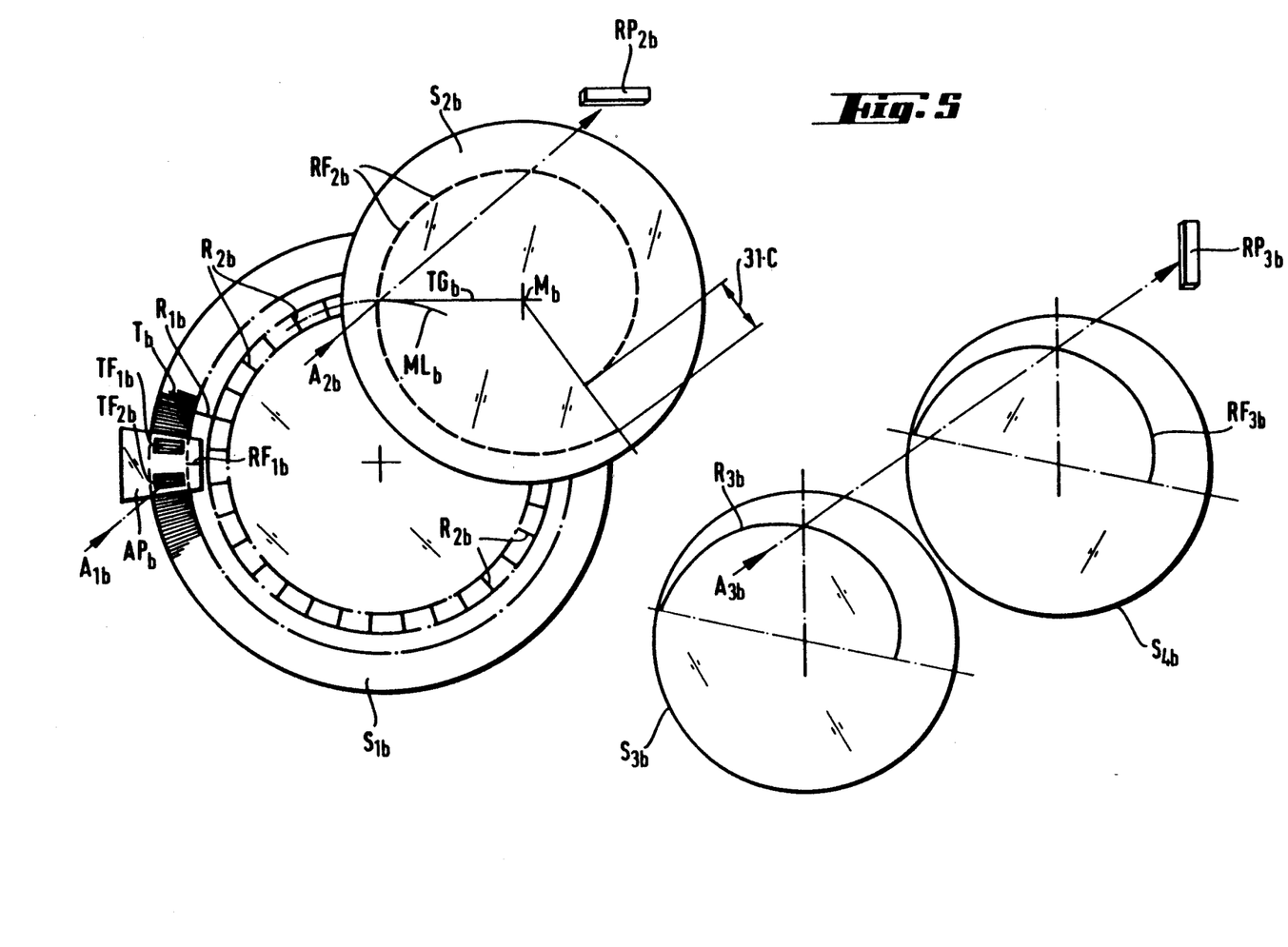
FIG. 5 is a schematic view of four disks used in the second embodiment of FIG. 4.

FIG. 4 is a cross-sectional view of an incremental angle encoder in accordance with a second embodiment of the present invention. The incremental angle encoder has four disks, $S_{1b}$, $S_{2b}$, $S_{3b}$ and $S_{4b}$. The four disks, $S_{1b}$–$S_{4b}$, are contained in a housing $G_b$ in the form of a stator which is fixed on a first object, for example on the machine frame of a machining tool (not shown). In the interior of the housing $G_b$ a first shaft $W_{1b}$ in the form of a decoder shaft is rotatably seated by means of bearings $L_b$ and connected with a second object, for example, the spindle of a carriage of a machining tool (not shown). The first shaft $W_{1b}$ supports the first disk $S_{1b}$. FIG. 5 schematically illustrates the four disks $S_{1b}$-$S_{4b}$. The first disk $S_{1b}$ has on its periphery an incremental angular graduation $T_b$ with a graduation period C. In addition, a first reference mark $R_{1b}$ is located on a first reference mark track. Also on a second reference mark track, thirty-two second reference marks $R_{2b}$ are positioned at even distances over the periphery of the first disk $S_{1b}$. The incremental angular graduation $T_b$ is shown as a line graduation and the reference marks $R_{1b}$ and $R_{2b}$ are each shown as single lines. The reference marks $R_{1b}$ and $R_{2b}$, however, can consist of a group of lines as is well known in the art. The reference marks $R_{1b}$ and $R_{2b}$ are fixedly assigned to the incremental angular graduation $T_b$.

Figure 6:
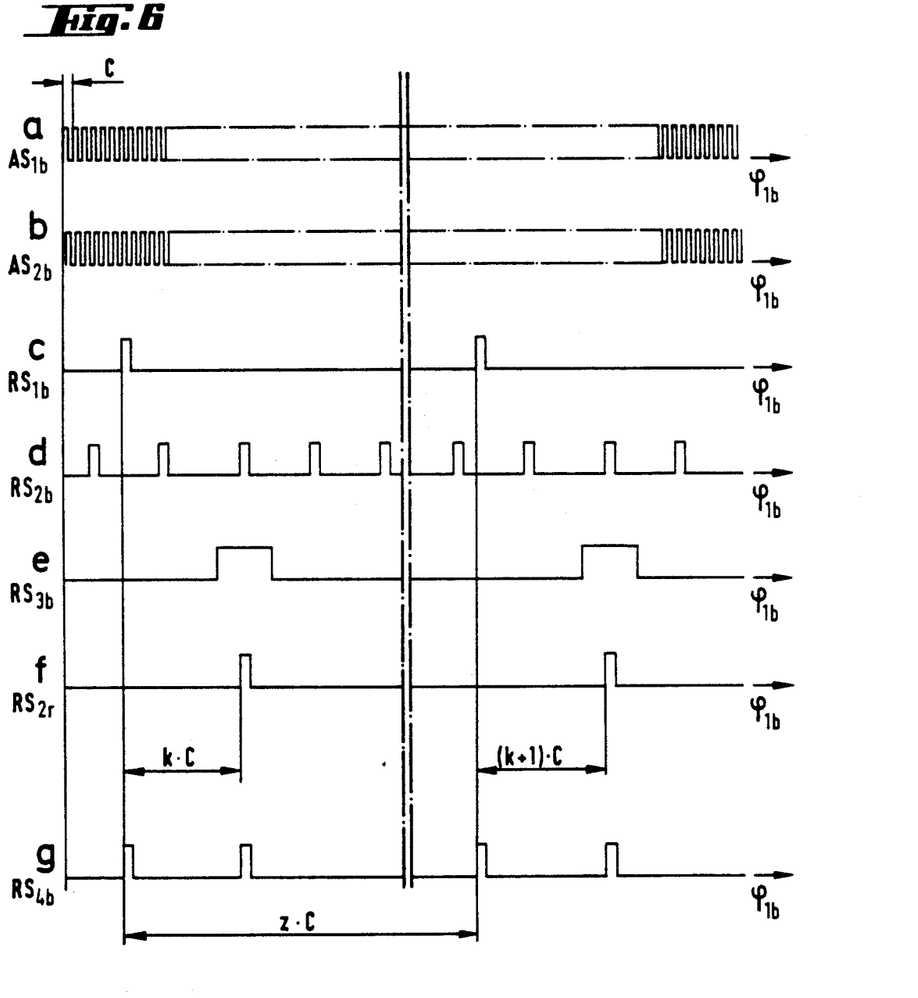
FIG. 6 is a signal diagram taken from the second embodiment of FIG. 4.

The incremental angular graduation $T_b$ of the first disk $S_{1b}$ is scanned by a first scanning unit $A_{1b}$, which has a first illuminating unit $B_{1b}$ with parallel beam path and two graduation scanning fields $TF_{1b}$ and $T_{2b}$ on a scanning plate $AP_b$. Scanning fields $TF_{1b}$ and $TF_{2b}$ are offset with respect to each other and two associated graduation photo elements $TP_{1b}$ and $TP_{2b}$ on a first photo element plate $PP_{1b}$ generate two scanning signals $AS_{1b}$ and $AS_{2b}$ which are offset by 90° with respect to each other. Scanning signals $AS_{1b}$ and $AS_{2b}$, illustrated in FIG. 6a and b, have a period C corresponding to the graduation period C of the incremental angular graduation $T_b$, as a function of the angle of rotation $\rho_{1b}$ of the encoder shaft $W_{1b}$. The angular measurement values and the direction of rotation of the first disk $S_{1b}$ are determined in a known manner.

In addition, the first scanning unit $A_{1b}$ scans reference mark $R_{1b}$. Associated with the first scanning unit $A_{1b}$ is a first reference scanning field $RF_{1b}$ on a scanning plate $AP_b$ as well as an associated first reference photo element $RP_{1b}$ on the first photo element plate $PP_{1b}$. A first reference signal $RS_{1b}$ consisting of one pulse per revolution of the first disk $S_{1b}$ is generated as is shown in FIG. 6c.

The thirty-two second reference marks $R_{2b}$ of the first disk $S_{1b}$ are scanned by a second scanning unit $A_{2b}$. The second scanning unit $A_{2b}$ has a second illuminating unit $B_{2b}$ with parallel beam path, thirty-two second reference scanning fields $RF_{2b}$ on the second disk $S_{2b}$, as well as an associated second reference photo element $RP_{2b}$ on a second photo element plate $PP_{2b}$. Thirty-two second reference signals $RS_{2b}$ are generated for each revolution of the first disk $S_{1b}$, shown in FIG. 6d. There is an angular offset between the first reference mark $R_{1b}$ and the first one of the second reference marks $R_{2b}$ on the first disk $S_{1b}$. As described above, the first reference mark $R_{1b}$ is scanned by the first reference scanning field $RF_{1b}$ while the first of the second reference marks $R_{2b}$ is simultaneously scanned by the first of the second reference scanning fields $RF_{2b}$. Thus, at the start of measurement, there is no offset between the first pulses of signals $RS_{1b}$ and $RS_{2b}$.

The second disk $S_{2b}$ is supported by a second shaft $W_{2b}$, which is rotatably seated in the interior of the housing $G_b$ and is driven by the first shaft $W_{1b}$ via a first reduction gear $UG_{1b}$. In this embodiment, the first reduction gear $UG_{1b}$ has a first reduction ratio $i_{1b}=32$. Thus, after each full revolution of the first disk $S_{1b}$, the second disk $S_{2b}$ has turned by 1/32nd of a revolution. The thirty-two second reference marks $R_{2b}$ of the first disk $S_{1b}$ are then scanned by the next following scanning field $RF_{2b}$ of the second disk $S_{2b}$. Similarly to the second scanning field $RF_{2a}$ of FIG. 2, these thirty-two second scanning fields $RF_{2b}$ are disposed spirally, each with a radial offset in accordance with a graduation period C of the incremental angular graduation $T_b$ on the second disk $S_{2b}$. Because the center $M_b$ of the second disk $S_{2b}$ is located on a tangent $TG_b$ at the center line $ML_b$ of the second reference marks $R_b$ of the first disk $S_{1b}$, the positions of the generated second reference signals $RS_{2b}$ in relation to the incremental angular graduation $T_b$ are not affected, even if there is relatively large play between the first disk $S_{1b}$ and the second disk $S_{2b}$ in the reduction gear $UG_{1b}$.

The first reference signal $RS_{1b}$ only indicates that the first disk $S_{1b}$ has made one complete revolution. It does not, however, indicate how many revolutions were made, i.e., k=1, 2, ... n from the beginning of measurement. During the first revolution of the first disk $S_{1b}$, the thirty-two second reference marks $R_{2b}$ are scanned by the second reference scanning field $RF_{2b}$. Thirty-two second reference signals $RS_{2b}$ are generated. One pulse of the signal $RB_{2b}$ always has the specific offset $1 \times C$ with respect to the first reference signal $RS_{1b}$. During the k-th revolution of the first disk $S_{1b}$, the thirty-two second reference marks $R_{2b}$ are scanned by the k-th second reference scanning field $RF_{2b}$ for generating thirty-two second reference signals $RS_{2b}$. One pulse has the specific phase offset $k \times C$ with respect to the first reference signal $RS_{1b}$. This specific offset $k \times C$ with respect to the first reference signal $RS_{1b}$ and the k-th second reference signal $RS_{2b}$ is caused by the radial offset of one graduation period C between adjacent second reference scanning fields $RF_{2b}$.

In order to detect which of the thirty-two second reference signals $RS_{2b}$ is generated by the k-th revolution of the first disk $S_{1b}$; specifically, which pulse has the specific offset $k \times C$ with respect to the first reference signal $RS_{1b}$, a third disk $S_{3b}$ is used. The third disk $S_{3b}$ is supported by the first shaft $W_{1b}$ and is concentric with the first disk $S_{1b}$. The third disk $S_{3b}$ has a third reference mark $R_{3b}$ in the shape of a spiral extending over 180° of the third disk $S_{3b}$. The angular area actually used, however, is less than 180°. A third scanning unit $A_{3b}$ is provided for scanning this third reference mark $R_{3b}$. The third scanning unit $A_{3b}$ has a third illuminating unit $B_{3b}$ with parallel light beam path and a third reference scanning field $RF_{3b}$ in the shape of a spiral on a fourth disk $S_{4b}$ as well as an associated third reference photo element $RP_{3b}$ on a third photo element plate $PP_{3b}$. A third reference signal $RS_{3b}$ is generated as shown in FIG. 6e as a function of the angle of rotation $\rho_{1b}$ of the encoder shaft $W_{1b}$ with the first disk $S_{1b}$.

The fourth disk $S_{4b}$ is supported by a third shaft $W_{3b}$, rotatably seated inside the housing $G_b$ and driven by the second shaft $W_{2b}$ via a second reduction gear $UG_{2b}$. In this embodiment, the second reduction gear $UG_{2b}$ has a second reduction ratio of $i_{2b}=32$. A resulting third reduction ratio $i_3=i_1 \times i_2=1024$ thus exists between the first disk $S_{1b}$ and the fourth disk $S_{4b}$. The spiral-shaped third reference scanning field $RF_{3b}$ therefore only makes one revolution per 1024 revolutions of the first disk $S_{1b}$. A third reference signal $RS_{3b}$ is generated for every revolution of the encoder shaft $W_{1b}$. The broadness of signal $RS_{3b}$ results from the relatively slight inclination of the spiral reference mark and scanning field located on the third disk and the fourth disk respectively. In addition, the inaccuracy resulting from the two reduction gears $UG_{1b}$ and $UG_{2b}$ contributes to the broadening of the third reference signal $RS_{3b}$. The effective scanning field formed by the spiral-shaped third reference scanning field $RF_{3b}$ appears to be radially displaced slowly in the course of a number of revolutions. Specifically, as the encoder shaft $W_{1b}$ revolves, different areas of the third reference scanning field $RF_{3b}$ detect the third reference mark $R_{3b}$. This is similar to the second scanning field $RF_{2a}$ shown in FIG. 2 wherein there is effectively thirty-two continuously sequential scanning fields. The extent of the parallel light beam path and the extent of the third reference photo element $RP_{3b}$ are slightly larger than the apparent radial displacement of the effective scanning field.

Because the spiral-shaped third reference mark $R_{3b}$ only extends over 180°, the spiral-shaped third reference scanning field $RF_{3b}$ also extends over 180°. The one valued function of the angle encoder is therefore only given over half a revolution of the third disk $S_{3b}$, so that the total number n of definitely distinguishable revolutions of the first disk $S_{1b}$ is $n < z/2$, where z equals the number of graduation periods C of the incremental angular graduation $T_b$. This is true if the two reduction ratios $i_{1b}$ and $i_{2b}$ multiplied together are greater than or equal to Z, i.e., $i_{1b} \times i_{2b} \geq z$. If $z = 1024$, then the encoder is capable of distinguishing 512 revolutions.

Based on the radial displacement of this effective scanning field or of the third reference scanning field $RF_{3b}$, the position of the third reference signal $RS_{3b}$ changes. If the fourth disk $S_{4b}$ were stationary, a third reference signal $RS_{3b}$ would be generated at each revolution of the encoder shaft $W_{1b}$. Thus, signal $RS_{3b}$ would be generated each time at $_{1b} = 360°$. Because the fourth disk $S_{4b}$ turns each revolution by $1/i_3$ or $1/1024$, the third disk must be turned by that additional amount to generate a third reference signal $RS_{3b}$. Thus if disk $S_{4b}$ were stationary, the third reference signal $RS_{3b}$ is generated at $\rho_{1b} = 360°$. Since disk $S_{4b}$ moves, the third disk must turn the additional amount, $\rho_{1b} = 360° (1 + n/i_3)$ where $n = 0-512$ revolutions. If the incremental angular graduation $T_b$ of the first disk $S_{1b}$ has the number $z = 1024$ graduation periods across an angular range of 360°, the third disk $S_{3b}$ must be turned an additional angle equal to one graduation period C for each revolution. Thus the position of the third reference signal $RS_{3b}$ changes with each revolution of the third disk $S_{3b}$ by one graduation period C with respect to the first reference signal $RS_{1b}$. As shown in the signal diagram in accordance with FIG. 6, a relatively large tolerance is possible for the position and width of the third reference signal $RS_{3b}$.

In order to accurately determine which second reference signal $RS_{2b}$ has the specific offset $k \times C$, the second reference signal $RS_{2b}$ and the third reference signal $RS_{3b}$ are combined by an AND operation into a resultant second reference signal $RS_{2r}$. The resultant second reference signal $RS_{2r}$ has a specific offset $k \times C$ with respect to the first reference signal $RS_{1b}$ as shown in FIG. 6f. The k-th revolution of the first disk $S_{1b}$ is shown on the left side of FIG. 6. The $(k+1)$-th revolution of the first disk $S_{1b}$ having the specific offset $(k+1) \times C$ is shown on the right side of FIG. 6. Depending on the direction of rotation of the first disk $S_{1b}$, the number k either increases or decreases by the value 1 per revolution of the encoder shaft $W_{1b}$ with the first disk $S_{1b}$.

The first reference signal $RS_{1b}$ and the resulting second reference signal $RS_{2r}$ can also be combined via an OR operation into a fourth signal $RS_{4b}$ in accordance with FIG. 6g. It is then possible to determine the number k for the k-th revolution of the first disk $S_{1b}$ easily in an evaluation unit (not shown).

In the same way as the first disk $S_{1b}$ and the second disk $S_{2b}$, the third disk $S_{3b}$ and the fourth disk $S_{4b}$ are disposed closely adjacent to each other in the direction of the light beam paths, the first disk $S_{1b}$ and the second disk $S_{2b}$ are eccentrically offset parallel to each other and the third disk $S_{3b}$ and the fourth disk $S_{4b}$ are concentrically offset parallel to each other.

If the reference marks $R_{1b}$, $R_{2b}$, $R_{3b}$ and the reference scanning fields $RF_{1b}$, $RF_{2b}$, $RF_{3b}$ are not each formed by a single line in accordance with FIG. 5, but rather consist of a group of lines with arbitrary division, it is possible to generate narrower and steeper reference signals $RS_{1b}$, $RS_{2b}$, $RS_{3b}$ with the further advantage of being able to use smaller reference photo elements $RP_{1b}$, $RP_{2b}$, $RP_{3b}$. It is also possible to use smaller reference photo elements $RP_{1b}$, $RP_{2b}$, $RP_{3b}$, if the parallel bundled light beams of the scanning units $A_{1b}$, $A_{2b}$, $A_{3b}$ are each focused by a lens. This creates the added advantage of having an encoder of reduced physical size.

In a manner not shown it is also possible to combine the thirty-two second reference scanning fields $RF_{2b}$ on the second disk $S_{2b}$ into a single, spiral-shaped reference scanning field. As shown in FIG. 5, the spiral-shaped third reference scanning field $RF_{3b}$ on the fourth disk $S_{4b}$ may have the same shape as the spiral-shaped third reference mark $R_{3b}$ on the third disk $S_{3b}$, so that maximum signal strengths result for the third reference signal $RS_{3b}$.

The absolute angular measurement value is determined from the scanning signals $AS_{1b}$ and $AS_{2b}$ and from the specific offset between the first reference signal $RS_{1b}$ and the resulting second reference signal $RS_{2r}$ for the respective number of revolutions.

Figure 7:
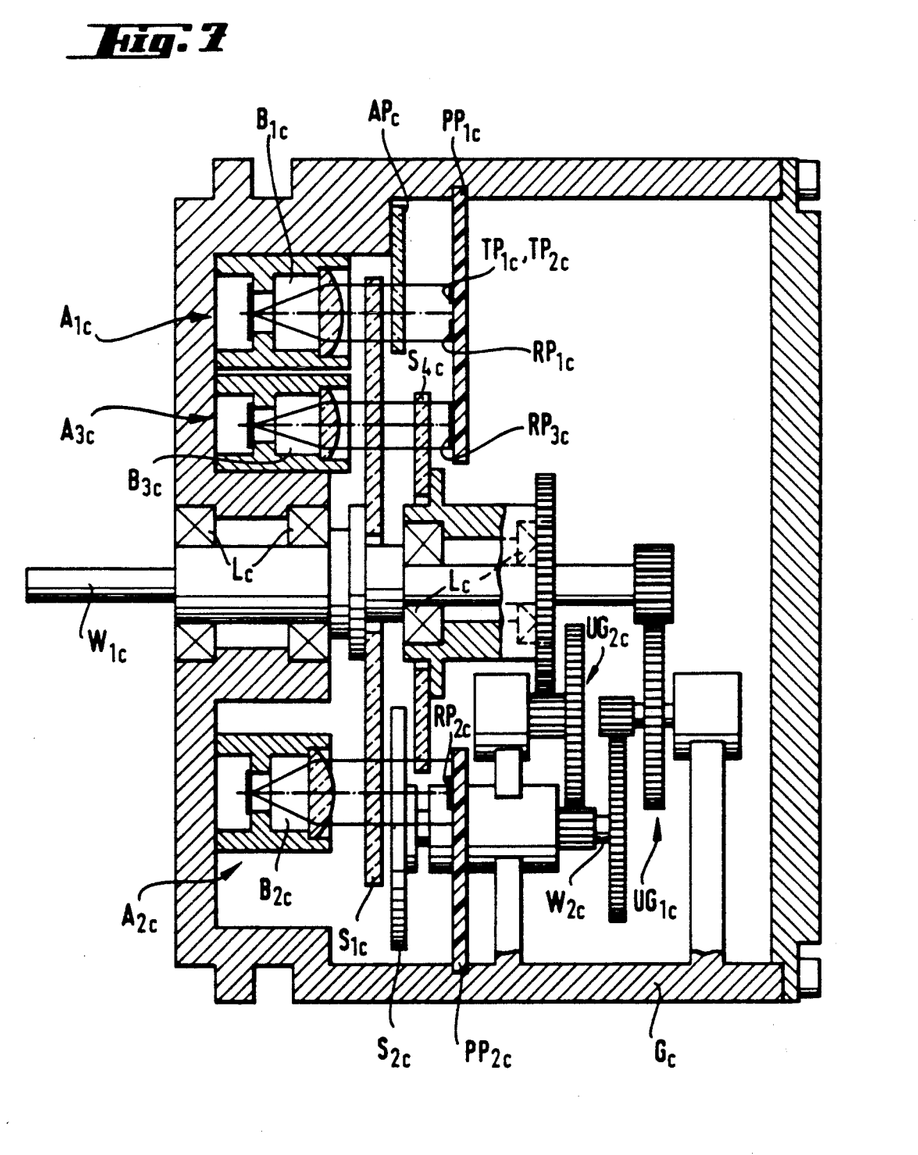
FIG. 7 is a cross-sectional view of an incremental angle encoder in accordance with a third embodiment of the present invention.

FIG. 7 is a cross-sectional view of an incremental angle encoder in accordance with a third embodiment of the present invention. The third embodiment uses three disks. According to this third embodiment, the third disk $S_{3b}$ shown in FIG. 5 has been superimposed on the first disk $S_{1b}$ so that the third disk $S_{3b}$ can be eliminated. Specifically, the third reference mark $R_{3b}$ has been concentrically disposed on the first disk $S_{1b}$. Thus, in FIG. 7, disks $S_{1c}$, $S_{2c}$ and $S_{4c}$ correspond to disks in FIGS. 4 and 5, $S_{1b}$ with $S_{3b}$ superimposed thereon, $S_{2b}$ and $S_{4b}$. The remaining elements correspond in a modified arrangement to the elements of FIG. 4 and therefore also have the same reference numerals, however, the letter "b" has been replaced by the letter "c". This third angle encoder has the advantage of a simplified construction.

While this invention has been shown and described in connection with preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. An incremental angle encoder which generates signals from which the number of revolutions can be determined thereby indicating an absolute measurement comprising:

a first disk having an incremental angular graduation and at least a first reference mark and a second reference mark;

an encoder shaft connected to said first disk;

a second disk having a spiral shaped reference scanning field;

a second shaft connected to said second disk;

a reduction gear connecting said encoder shaft with said second shaft wherein said reduction gear creates a reduction ratio between said first disk and said second disk; and scanning means for generating a first reference signal by scanning said first reference mark on said first disk and a second reference signal by means of scanning said second reference mark through said spiral shaped reference scanning field of said second disk wherein the number of revolutions of said encoder shaft is determined by the offset between the first and second reference signals.

2. An incremental angle encoder according to claim 1 wherein said spiral shaped scanning field comprises a number of scanning fields equal to said reduction ratio, each of said scanning fields radially offset with respect to each other.

3. An incremental angle encoder according to claim 2 wherein said radial offset is equal to one graduation period of said incremental angular graduation.

4. An incremental angle encoder according to claim 3 wherein said first disk and said second disk are eccentrically offset and parallel to one another.

5. An incremental angle encoder which generates signals from which the number of revolutions can be determined thereby indicating an absolute measurement comprising:

a first disk having an incremental angular graduation, a first reference mark and a number of equidistant second reference marks;

an encoder shaft connected to said first disk;

a second disk having the same number of reference fields as there are second reference marks, said reference scanning fields arranged spirally on said second disk, each field being radially offset with respect to the next field;

a second shaft connected to said second disk;

a first reduction gear connecting said encoder shaft with said second shaft wherein said reduction gear creates a first reduction ratio between said first disk and said second disk;

a third disk connected to said encoder shaft having a spiral shaped reference mark;

a fourth disk having a spiral shaped reference scanning field;

a third shaft connected to said fourth disk;

a second reduction gear connecting said encoder shaft with said third shaft wherein said reduction gear creates a second reduction ratio between said first disk and said fourth disk;

first scanning means for generating a first reference signal from scanning said first disk and a second reference signal by means of scanning said first reference mark on said spiral shaped scanning fields of said second disk;

second scanning means for generating a third reference signal by means of scanning said spiral shaped reference mark on said third disk through said scanning field of said fourth disk; and means for combining said second and third reference signals into a resultant signal so that the number of revolutions of said encoder shaft is determined by the offset between said first signal and said resultant signal.

6. An incremental angle encoder according to claim 5 wherein said reference mark of said third disk is concentric with said graduation of said first disk.

7. An incremental angle encoder according to claim 5 wherein each of said reference scanning fields is radially offset with respect to the next field by one graduation period of said incremental angular graduation.

8. An incremental angle encoder according to claim 5 wherein said spiral shaped reference mark of said third disk and said reference field of said fourth disk have the same gradient.

9. An incremental angle encoder according to claim 5 wherein said first disk and said second disk are eccentrically offset and parallel to one another.

10. An incremental angle encoder according to claim 5 wherein said third disk and said fourth disk are concentrically positioned.

11. An incremental angle encoder according to claim 5 wherein said third disk is concentrically positioned with respect to said first disk.

12. An incremental angle encoder according to claim 5 wherein said second and third reference signals are combined by a logic operator to produce said resultant signal.

13. An incremental angle encoder according to claim 12 wherein said logic operator comprises an AND gate.

14. An incremental angle encoder which generates signals from which the number of revolutions can be determined thereby indicating an absolute measurement comprising:

a first disk having an incremental angular graduation, a first reference mark, a number of equidistant second reference marks and a spiral shaped reference mark;

an encoder shaft connected to said first disk;

a second disk having the same number of reference scanning fields as there are second reference marks said reference scanning fields arranged spirally on said second disk, each field being radially offset with respect to the next field;

a second shaft connected to said second disk;

a first reduction gear connecting said encoder shaft with said second shaft wherein said reduction gear creates a first reduction ratio between said first disk and said second disk;

a third disk having a spiral shaped reference scanning field;

a third shaft connected to said third disk;

a second reduction gear connecting said encoder shaft with said third shaft wherein said reduction gear creates a second reduction ratio between said first disk and said third disk;

first scanning means for generating a first reference signal from scanning said first disk and a second reference signal by means of scanning said first reference mark on said spiral shaped scanning fields of said second disk;

second scanning means for generating a third reference signal by means of scanning said spiral shaped reference mark on said first disk through said scanning field of said third disk; and means for combining said second and third reference signals into a resultant signal so that the number of revolutions of said encoder shaft is determined by the offset between said first signal and said resultant signal.

15. An incremental angle encoder according to claim 14 wherein said reference mark of said first disk is concentric with said graduation of said first disk.

16. An incremental angle encoder according to claim 14 wherein each of said reference scanning fields is radially offset with respect to the next field by one graduation period of said incremental angular graduation.

17. An incremental angle encoder according to claim 14 wherein said spiral shaped reference mark of said first disk and said reference field of said third disk have the same gradient.

18. An incremental angle encoder according to claim 14 wherein said first disk and said second disk are eccentrically offset and parallel to one another.

19. An incremental angle encoder according to claim 14 wherein said first disk and said third disk are concentrically positioned.

20. An incremental angle encoder according to claim 14 wherein said second and third reference signals are combined by a logic operator to produce said resultant signal.

21. An incremental angle encoder according to claim 20 wherein said logic operator comprises an AND gate.

* * * * *

UNITED STATES PATENT AND TRADEMARK OFFICE
CERTIFICATE OF CORRECTION

PATENT NO. : 5,066,857
DATED : November 19, 1991
INVENTOR(S) : Alfons Ernst It is certified that error appears in the above-identified patent and that said Letters Patent is hereby corrected as shown below:

In column 1, line 52, please delete "accurately" and substitute therefor --accuracy--.

In column 3, line 32, after "angle" please delete "cf" and substitute therefor --of--.

In column 3, line 41, please delete "risk" and substitute therefor --disk--.

Signed and Sealed this

Twenty-second Day of June, 1993

Attest:

MICHAEL K. KIRK

*Attesting Officer*    *Acting Commissioner of Patents and Trademarks*